United States Patent [19]

O'Dell et al.

[11] Patent Number: 4,567,087
[45] Date of Patent: *Jan. 28, 1986

[54] SCUFF RESISTANCE IN ABRASION-RESISTANT LAMINATES

[75] Inventors: Robin D. O'Dell, Pasadena; Israel S. Ungar; Herbert I. Scher, both of Randallstown, all of Md.

[73] Assignee: Nevamar Corporation, Odenton, Md.

[ * ] Notice: The portion of the term of this patent subsequent to Dec. 12, 2002 has been disclaimed.

[21] Appl. No.: 508,629

[22] Filed: Jun. 28, 1983

[51] Int. Cl.$^4$ .......................... B32B 3/00; B32B 7/14; B32B 5/18; B32B 9/06
[52] U.S. Cl. .................................... 428/211; 156/222; 428/204; 428/327; 428/147; 428/322.2; 428/486
[58] Field of Search ............... 428/327, 484, 524, 211, 428/204, 147, 486, 322.2

[56] References Cited

U.S. PATENT DOCUMENTS

| | | |
|---|---|---|
| 1,992,249 | 2/1935 | Snyder . |
| 2,041,041 | 5/1936 | Batcheller . |
| 2,227,212 | 12/1940 | Beck . |
| 2,372,679 | 4/1945 | Magid ................................ 428/484 |
| 2,537,019 | 1/1951 | Barrett . |
| 2,540,996 | 2/1951 | Ryden ............................ 428/484 X |
| 2,828,219 | 3/1958 | Heiges et al. .................... 428/484 X |
| 2,872,365 | 2/1959 | de Bruyne et al. . |
| 3,218,225 | 11/1965 | Petropoulos . |
| 3,480,693 | 11/1969 | Hill et al. . |
| 3,490,969 | 1/1970 | Schiff . |
| 3,726,817 | 4/1973 | Niswonger . |
| 3,736,220 | 5/1973 | Shah .................................. 428/327 |
| 3,975,572 | 8/1976 | Power . |
| 3,983,307 | 9/1976 | Power et al. . |
| 4,094,846 | 6/1978 | DeLapp . |
| 4,094,847 | 6/1978 | Huffman et al. . |
| 4,109,043 | 8/1978 | DeLapp . |
| 4,112,169 | 9/1978 | Huffman et al. . |
| 4,117,198 | 9/1978 | Power et al. . |
| 4,118,541 | 10/1978 | Power et al. . |
| 4,139,671 | 2/1979 | Kelly et al. . |
| 4,255,480 | 3/1981 | Scher et al. ......................... 428/208 |
| 4,263,081 | 4/1981 | Scher et al. ..................... 428/208 X |

OTHER PUBLICATIONS

A two-page Allied Chemical Technical Data Sheet G-1.
A seven-page package from Shamrock Chemical, including reprint from "American Inkmaker", vol. 6, No. 59, and technical data sheets.
A two-page Technical Data Sheet from Micro-Powders, Inc.
Article reprinted from "American Inkmaker", re use of Low-Molecular Weight Polyethylenes in Printing Inks (Tubbs).
Article reprinted from "American Inkmaker", on Polyethylene in Printing Inks which appears to have been incorporated into an Allied Chemical Technical Data Sheet.
A two-page Allied Chemical Technical Data Sheet I-1.
Five pages of Technical Data Sheets from Micro-Powders, Inc.

Primary Examiner—George F. Lesmes
Assistant Examiner—Nancy A. B. Swisher
Attorney, Agent, or Firm—Karl W. Flocks; Sheridan Neimark

[57] ABSTRACT

The scuff resistance of high-pressure laminated plastic is improved by incorporating in or very near the surface thereof, finely divided polyethylene wax having a particle size of about 1-25 microns and a melting point of preferably 220°-230° F. The wax is incorporated as part of an abrasion-resistant coating mixture applied to the face of an unimpregnated decor paper sheet in an ultra-thin layer, which layer is dried at a temperature below the wax melting point and then impregnated with conventional melamine-formaldehyde resin. The impregnated sheet is placed onto a sheet of convention phenolic resin impregnated core sheets and consolidated in the conventional way under heat and pressure. During consolidation, the wax particles "bloom", or migrate to the surface. The finished laminate surface has greatly improved scuff resistance.

20 Claims, No Drawings

SCUFF RESISTANCE IN ABRASION-RESISTANT LAMINATES

FIELD OF INVENTION

The present invention relates to laminates and, more particularly, decorative laminates of high abrasion and scuff resistance.

BACKGROUND

High pressure decorative laminates are conventionally produced by stacking and curing under heat and pressure a plurality of layers of paper impregnated with various synthetic thermosetting resins. In normal practice the assembly, from the bottom up, consists of a plurality, e.g. three to eight, core sheets made from phenolic resin impregnated kraft paper, above which lies a decor sheet impregnated with melamine resin; on top of the decor sheet is provided an overlay sheet which, in the laminate, is almost transparent and provides protection for the pattern sheet.

The core sheets are conventionally made from kraft paper of about 90–155 pound ream weight. Prior to stacking, the kraft paper is impregnated with a water-alcohol solution of phenolformaldehyde resole, dried and partially cured in a hot air oven, and finally cut into sheets.

The decor sheet is a high quality, 50–125 ream weight, pigment filled, alpha cellulose paper that has been impregnated with a water-alcohol solution of melamine-formaldehyde resin, dried and partially cured, and finally cut into sheets. The decor sheet, prior to impregnation with the resin, usually has been printed with a decorative design, or with a photo-gravure reproduction of natural materials, such as wood, marble, leather, etc., but it may also be solid colored.

The overlay sheet is almost invariably used when the decor sheet has a surface printing in order to protect the printing from abrasive wear. The overlay sheet is a high quality alpha cellulose paper of about 15–35 pounds ream weight that is also impregnated with melamine-formaldehyde resin in a manner similar to that used for the decor sheet, except that a greater amount of resin per unit weight of paper is used. The individual sheets are stacked in the manner indicated above and, if six sheets of impregnated core paper are used, there results a finished laminate having a thickness of about 50 mils, it being understood that a different number of sheets can be used to provide thicker or thinner laminates.

The stack of sheets as described above is placed between polished steel plates and subjected to about 230°–340° F. (e.g. 300° F.) at 800–1600 p.s.i. (e.g. 1000 p.s.i.) for a time sufficient to consolidate the laminate and cure the resins (e.g., about twenty-five minutes). This causes the resin in the paper sheets to flow, cure and consolidate the sheets into a unitary laminated mass referred to in the art as a decorative high-pressure laminate. In actual practice, two laminated stacks are pressed back to back, separated by a coated release sheet that allows the two laminates to be peeled apart after separation. Also, a large proportion of the stacks are laminated with an aluminum foil-kraft paper composite sheet inserted between the overlay and the metal plate, with the aluminum facing the overlay, in order to obtain a laminate having a lower gloss and a slightly textured surface which is desirable for some products.

At the completion of the laminating operation, the backs of the laminates are sanded to permit gluing to particle board, plywood or other substrates. The glued, laminate surfaced panel is then fabricated into furniture, kitchen counter tops, table tops, store fixtures and other end-use applications widely accepted for the combination of appearance, durability and economy.

A number of variations of the above-described general process are known, particularly those operations designed to obtain special effects in appearance and texture. Also other curing cycles are possible and, in fact, sometimes other resin systems are used as well.

Besides decorative high-pressure laminates referred to above, there are also a number of low-pressure products which have been developed in recent years, including low-pressure laminates using either saturated polyester resins, or melamine-formaldehyde resin. One of the fastest growing materials competing with high-pressure laminates in recent years is a product referred to as low-pressure melamine board which is normally pressed in a short cycle at 175–225 p.s.i. at 325°–350° F. These low-pressure products have the advantage of being normally less expensive, but they cannot be given the title of "high pressure laminates" because such a product must meet a variety of rigid standards promulgated by the National Electric Manufacturers Associates, NEMA LD3-1980, which include standards relating to abrasive wear, stain resistance, heat resistance, impact resistance, dimensional stability, etc. While various other decorative printed, surfacing materials, such as some of the low-pressure laminates, have certain of the desirable characteristics, no products other than high-pressure laminates currently available have all of these properties.

One of these properties in particular which is very important is abrasion resistance. A high-pressure decorative laminate must have sufficient abrasion resistance to permit use in high exposure areas such as dinette surface tops, check-out counters, etc. The standard NEMA test for abrasion resistance is NEMA test LD-3.01. In this test, a laminate sample is clamped on a rotating disc, over which ride two weighted rubber wheels, faced with calibrated sand-paper strips. As the laminate surface is rotated under the wheels, the abrasive action of the sand paper cuts through the surface of the laminate and gradually through the overlay until the printed pattern is exposed and destroyed. The NEMA standard for Class I laminate requires that the laminate, after four hundred rotation cycles, has no more than 50% of its pattern destroyed. The 50% end point is estimated by averaging the number of cycles at which the pattern shows initial wear, and the number of cycles at which the pattern is completely destroyed.

If a high-pressure decorative laminate is prepared in a conventional manner, with a normal 35–40% resin content in the decor sheets, but without an overlay sheet, the abrasion resistance will be only about 50–75 cycles. If specially formulated melamine resins are used in the decor sheet with a resin content of 50–55%, abrasion resistance of up to about 150–200 cycles are on occasion obtainable without an overlay sheet, but in this latter case the laminates have a tendency to develop surface craze and, furthermore, they are quite difficult to prepare due to the difficulty of impregnating the decor sheet in a uniform manner; additionally, they do not meet the 400 cycle minimum required by the NEMA standard.

Very significant improvements to the conventional system described above are disclosed in Scher et al., U.S. Pat. Nos. 4,255,480 and 4,263,081. These patents and their progeny disclose the production of highly abrasion resistant laminates without overlay, the decor sheet being coated with an ultra-thin layer of small abrasion-resistant particles, e.g. alumina, immobilized in place on the decor sheet by a suitable binder material, most desirably micro-crystalline cellulose.

The elimination of the overlay sheet produces very significant economic advantages. In addition, the resultant laminates have superior abrasion resistance, meeting not only the highest NEMA abrasion resistance standards, but also having both superior "initial wear" resistance and superior abrasion resistance to rubbing and sliding cans.

Besides resistance to abrasion and wear, it is necessary that decorative laminates, especially "high-pressure laminates," have surfaces characterized by resistance to heat, stain by common household chemicals and foods, impact and boiling water, all consistent with the NEMA LD3-1980 standards.

In addition to the above, another source of damage to a laminate surface is scuffing. Prior to the actual installation of a laminate surface, the laminate sheet must be handled many times, cut to size, bonded to a substrate, cut to final size, edged, and then finally moved to a final location and installed. During all this handling, the laminate surface can come into sliding contact with surfaces of other sheets, corners of sheets, and corners of edges of other materials. During these various sliding contacts, the laminate surface can gain unsightly scuff marks, which are not distinctly scratches or cuts in the laminate surface. The scuffs often appear to be a deposit of material from the object rubbing in contact with the laminate surface. For example, if a white colored laminate is rubbed by the corner or edge of a blue colored laminate, the scuff mark appears to have embedded therein blue particles. In this sense, the scuff mark is analogous to the process known as "galling" when two similar clean surfaces of metals are rubbed together at high pressure. It is well known to metallurgists that galling represents a transfer of metal from one surface to the other.

Some scuffs do not have an obvious transfer of material from an offending contacting object. In these cases, the area of the scuff appears to have been burnished to a higher gloss, or dulled to a lower gloss. This type of scuff appears to be caused by a very small amount of flow in the laminate surface due to the pressure of contact with the corner or edge of the offending object. Most frequently, however, the scuffs appear to be caused by a combination of the two effects just described, i.e. galling together with burnishing or dulling.

In the past, most decorative laminates were produced in light colors for work tops and other large area uses. Dark or intense colors could not be used in large areas because of the scuffing problem and therefore were most often used in smaller areas for color accents. Within the past ten years, however, the demand for dark and intense colors has greatly increased, even for large area uses such as the surfaces on store fixtures, elevator cabs, restaurant tables. As scuff marks of the kind described are much more visible when they occur on dark or intensely colored surfaces, than on light colored surfaces, they are much more objectionable to the owners of the installation. This has caused a significant amount of customer dissatisfaction, and considerable expense to the manufacturers and fabricators of laminate for replacement of defective installations.

While the laminates of the aforementioned Scher et al., U.S. Pat. Nos. 4,255,480 and 4,263,081, are much improved in abrasion resistance, initial wear resistance and rub resistance, they are quite subject to scuffing, particularly the "galling" type described above, and this is so because their surfaces can act, at the microscopic level, like sand paper, i.e. the hard particles at the surface of the decor sheet can actually protrude above the surface of the finished laminate. This problem is enhanced when the decor sheet is solid, dark colored.

Accordingly, it would be advantageous to provide a decorative laminate which, while maintaining high abrasion resistance, avoids and reduces the problem of scuffing.

SUMMARY

It is accordingly, an object of the invention to overcome deficiencies in the prior art, such as indicated above.

It is another object to provide improved decorative laminates; and to develop improved scuff resistance in the surface of decorative laminated plastic;

accomplish the improvement in an economical manner compatible with the laminating process; and not harm other desirable properties of the laminate, and in particular, not reduce the clarity of the color or decorative printing in the decor layer.

These and other objects of the invention are attained by incorporating suitable lubricating substances into the ultra-thin coatings of U.S. Pat. Nos. 4,255,480; 4,263,081; 4,305,987; and 4,327,141. Even though the hard abrasion-resistant particles remain at the laminate surface and continue to provide the enhanced abrasion resistance described in such patents, it has been surprisingly found that the added lubricant provides substantially improved scuff resistance. In other words, it has been found possible to incorporate a lubricant into the abrasion-resistant surface without reducing the physical properties inherent in such abrasion-resistant surface. This result is surprising because, particularly on the macroscopic level, it was incorrectly believed that a lubricant would work contrary to the abrasion-resistant particles.

Another aspect of the invention involves how to incorporate such a lubricant into the abrasion-resistant surface without reducing the physical properties of the laminate.

DETAILED DESCRIPTION OF EMBODIMENTS

The scuff resistance of high-pressure laminated plastic is improved by incorporating in or very near the surface finely divided solid wax particles having a particle size of up to 30 microns and a melting point of about 150°-285° F., preferably 220°-230° F. The wax is incorporated in a coating mixture applied as part of the abrasion-resistant coating of the aforementioned Scher et al. patents (which are incorporated herein by reference) to the face of an unimpregnated decor paper sheet, which is dried at a temperature below the wax melting point, and then impregnated with conventional melamine-formaldehyde resin. The impregnated sheet is placed onto a stack of conventional phenolic resin impregnated core sheets, and consolidated under heat and pressure. During consolidation, the wax particles "bloom," or migrate to the surface. The finished laminate surface is more slippery than normal, and has greatly improved scuff resistance. The particle size and concentration of the wax are selected to avoid reducing the color intensity or clarity of the decorated surface of the decor sheet.

The selection of the lubricant is important to obtain satisfactory results. Accordingly, the lubricant or mixture of lubricants should be compatible with the other components of the ultra-thin abrasion-resistant layer as disclosed in the aforementioned Scher et al. U.S. Pat. No. 4,255,480, etc. Also, it should melt during pressing so that it will bloom to the laminate, e.g. melamine, surface and be locked in without causing haze or deterioration. The wax should melt at a temperature below 260° F. to avoid haze in the product. However, haze can sometimes be tolerated, and therefore some higher melting waxes can sometimes be used, even through they do not melt during the laminating procedure.

A large number of waxes have been evaluated having different melt viscosities, melting points, and percents oxidation, in anionic and nonionic dispersions. It has been found that a nonionic type has less yellowing and high melt viscosity gives better dispersion. It has also been determined that lower melting point waxes bloom better and give more lubricity at lower concentration.

It has been also determined that powdered polyethylene can be dispersed in abrasion-resistant compositions as an inert material similar to other insolubles without the use of detergents. It has been demonstrated that oxidized waxes work well as a lubricant but are subject to staining on the final laminate.

While it has been found that best results are achieved with fine powder wax, preferably micronized polyethylene wax, a wide variety of other lubricants can be used, depending on the circumstances. For example, it has been found that some lubricants will cause the resultant laminate to have a hazy surface, which result is undesirable in most cases; however, there are some colors in which haze is tolerable. Among lubricants which are not preferred but which may be used under certain conditions may be mentioned micronized fluorocarbon polymers, tetrafluoroethylene polymer in fine particle size (e.g. SST-2 of Shamrock Chemicals Corporation or "Polyfluo 190" of Micro Powders, Inc.); stearates, such as sodium and zinc stearate; solid silicone resins; oxidized polyethylene waxes; microcrystalline waxes; ethylene co-polymers with acrylic acid or with vinyl acetate, etc. However, as noted above, the preferred lubricants constitute micronized polyehtylene waxes, and particularly those commonly used in the formation of printing inks.

Crucial to producing the best product which is free of haze is to ensure that the lubricant melts during the laminating operation. However, if the lubricant melts at too low a temperature, i.e., at less than 140° F. or any temperature higher which is used during the drying of the abrasion-resistant ultra-thin coating, the molten lubricant will tend to wet the fibers of the decor sheet and will thereby cause blotches or a mottled appearance and frosty color, which is undesirable in most cases, and/or even worse, will interfere with the wetting of the decor sheet by the impregnating resin (melamine or polyester) thereby resulting in an incompletely bonded laminate, a situation which cannot be tolerated. It is accordingly important in most cases that a solid lubricant be selected which does not melt during the drying of the ultra-thin abrasion-resistant coating, but which does melt subsequently during the laminating procedure.

Another important factor is the quantity of lubricant used. In general, the scuff resistance of the resultant abrasion-resistant laminate tends to taper off as the quantity of lubricant becomes less than 3% based on the total weight of the dry components of the abrasion-resistance composition, and therefore a practical minimum is about 2.5% with amounts less than about 2% giving scuff resistance which in most cases is insufficient. The maximum quantity, again based on the total weight of dry components of the abrasion-resistant coating, can be 10% or more wax. If too much wax is used, it can result in clouding or haze; excessive quantities can result in a waxy surface failing to meet other NEMA LD-3 requirements. In terms of rate of application of wax, it has been found that excellent results are achieved at the application rate of 0.25 pounds of wax per ream of decor paper, and quantities of 0.175 to 0.5 pounds of wax per ream of decor paper have been used without problem.

The following examples and comparative examples will further illustrate the invention:

COMPARATIVE EXAMPLE 1

High-pressure decorative ARP laminate was made according to the process of Scher et al., U.S. Pat. No. 4,255,480. After pressing and cooling, it was found that the surface was hard and had a high abrasion resistance and rate of wear according to NEMA LD3-1980. In addition, the superior scratch resistance of the ARP laminate could be demonstrated by rubbing with flint sand paper, which when rubbed on ordinary laminate completely destroyed surface gloss and finish. While the sand paper did not harm the ARP laminate, when the surface was stroked or rubbed with the edge of a light colored material, it showed signs of scuffing. Light material abraded and became embedded into surface of hard laminate. This deficiency is important because laminate is often subjected to sliding attack. One laminate may be pulled over another or another object may be rubbed over laminate surface by the ultimate consumer.

In various experiments, soaps such as sodium and zinc stearate were applied to the surface of the laminate. Unfortunately, this technique only supplied temporary improvement. Material washed off easily and the problem returned. Incorporation of these types of materials in melamine used for saturation of abrasion-resistant coated paper did not have any effect until concentration was so high that melamine properties deteriorated. Addition of stearates to the abrasion-resistant composition also gave poor results; excessive quantities were needed, and the stearates also, being soluble in water, washed from the surface.

COMPARATIVE EXAMPLE 2

Following the technique of the second part of Comparative Example 1, a number of dispersible waxes, especially polyethylene waxes, were incorporated in the melamine resin. These included Allied Chemical's AC629 and Duro Chemical UniWax 2000 and 1050. We evaluated 2.5%, 5%, 10%, 15%, and 20% of wax in resin. In addition, a liquid silicone mold release, Dow QL-3667, was evaluated in the melamine. As before, improvement was found only at high levels where surface properties deteriorated.

COMPARATIVE EXAMPLE 3

In this example, the liquid silicone mold release agent, Dow QL-3677, was incorporated in the abrasion-resistant composition prior to its application to the face of the decor sheet. Again, good results were not achieved.

COMPARATIVE EXAMPLE 4

In this example, polytetrafluoroethylene ("Polyfluo 190") having a congealing point of 250°–270° F. was added to the abrasion-resistant composition before coating onto a decor sheet in an ultra-thin layer. The results were only fair. Excessive quantities of PTFE are necessary to obtain even moderate scuff resistance. Another disadvantage of PTFE is its high cost.

EXAMPLE I

To 64 gallons of water at 90°–105° F. were added slowly 6 pounds of carboxymethyl cellulose 7L (Hercules) with stirring until the CMC dissolved. Then, 33.8 pounds Avicel RC791 (FMC) microcrystalline cellulose were added and the mixture was stirred until the viscosity reached 1900 at 12 cps. Next were added 33.8 pounds of alumina WCA-30 (Microabrasives) and 300 ml silane A-100 (Union Carbide). The viscosity at this point was 2150 cps. At this point, another 3.8 pounds of carboxymethyl cellulose in 8 gallons of water were added, the viscosity then being 2100 cps.

At this stage, an emulsion of 2.4 pounds of dispersible polyethylene wax, Uniwax 1050 (Durochemicals) in water were added, and the viscosity at this point was 1550 cps at 12 rpm. This composition was coated over the decor paper in an ultra-thin layer at the rate of 3–5 pounds per ream. The ultra-thin coating was dried at a temperature greater than 140° F., but less than the melting point of the polyethylene wax. The so-coated decor sheet was treated with melamine resin to 50%–55% resin content and 5%–7% volatile.

The so-manufactured decor paper was assembled on a phenolic core and pressed normally at 1,000 psi and 260°–300° F. The resultant laminate looked normal and had excellent abrasion resistance as well as a low rate of wear, much lower than normal. The laminate surface was slick to the touch and did not scuff. Attempts to scratch the laminate surface with sand were unsuccessful.

EXAMPLE II

To 64 gallons of water were added 4 pounds of carboxymethyl cellulose 7L followed by mixing for 15 minutes. Next, 2.6 pounds of micronized polyethylene wax (Shamrock 394 [1]) and 20 pounds of Avicel RC591 microcrystalline cellulose were added and the mixture was stirred at a high shear until the viscosity was between 1500 and 2000 cps at 12 rpm. Next, 24 pounds of alumina WCA-30 and 435 ml of silane A-1100 were added. Finally, 8 gallons of carboxymethyl cellulose mix containing 3.8 pounds of CMC-7L were added and the pH was adjusted with 2.5 pounds acetic acid.

[1] Shamrock S-394 polyethylene has a melting point of 230° F. a specific gravity of 0.95; a penetration of less than 1; and and average particle size of approximately 12.5 microns.

The composition was coated onto core paper at 3–5 pounds per ream dry weight, the coating was dried without melting the wax, and decor paper was impregnated with melamine resin to 50%–55% resin content and 5–7% volatile. The decor paper was used in the manufacture of a laminate and tested as in Example 1, with results being the same.

Almost 200 sheets of laminate made according to Example II were processed. Laminate was handled similar to controls. Sheets were stacked in racks then pulled 10 at a time and packaged. Package was shipped to field terminal, inserted in rack, and withdrawn for examination. Experimental laminate experienced no damage. Controls ran between 11%–14% defective due to severe scuff marks depending on color.

EXAMPLE III

Method of Example II was repeated. The following waxes were tested with similar results:

| | |
|---|---|
| AC 735 | Allied Chemical Company |
| MPP123 | Micro Powders |
| A-12 | Allied Chemical Company |
| AC392 | Allied Chemical Company |
| B6 | Allied Chemical Company |
| Shamrock 395 | Shamrock Chemical Company |
| MPP620 | Micro Powders |
| AC316 | Allied Chemical Company |
| AC540 | Allied Chemical Company |
| MPP611 | Micro Powders |

AC735 is a micronized polyethylene homopolymer having a softening point (ASTM E-28) of 110° C. and 230° F.; a hardness (ASTM D-5) of 2.5 dmm; a density (ASTM D-1505) of 0.92 g/cc; and a Brookfield viscosity at 140° C. (284° F.) of 6,000 cps.

Lubricant A-12 is a "Polymist" polyethylene fine powder, having a density of 0.99 g/cc; a hardness of 0.5 dmm (100 g/5sec./25° C.); a softening point of 140° C. (284° F.); an acid number of 30; an average particle size of 12 microns, and a particle size distribution of 2-24 microns.

Lubricant AC392 is an oxidized polyethylene homopolymer having a softening point of 138° C. (280° F.); a hardness of less than 0.5 dmm; a density of 0.99; a Brookfield viscosity of 9,000 cps at 149° C. (300° F.); and an acid number of 28.

Lubricant B6 is another "Polymist", polyethylene fine powder, having a density of 0.96; a hardness of 0.5 dmm; a softening point of 128° C. (262° F.); an average particle size of 6 microns; and a particle size distribution of 2-12 microns.

Lubricant AC316 is another oxidized polyethylene homopolymer having a softening point of 140° C. (284° F.); a hardness of less than 0.5 dmm; a density of 0.98; a Brookfield viscosity of 30,000 cps at 149° C. (300° F.); and an acid number of 16.

Lubricant AC540 is an emulsifiable ethylene/acrylic acid co-polymer having a softening point of 108° C. (226° F.); a hardness of 2.0 dmm; a density of 0.93; a Brookfield viscosity at 140° C. (284° F.) of 500 cps; and an acid number of 40.

Lubricant MPP123 is a micronized polyethylene wax, having a melting point of 230°–235° F.; a congealing point of 215°–220° F.; a penetration at 77° F. of 1.5; an acid and saponification value of 0; a density at 77° F. of 0.92; a maximum particle size of 15 microns and an average particle size of 4 microns.

Lubricant MPP620 is a micronized polyethylene wax, having a melting point of 241° F.; a congealing point of 237° F.; a penetration at 77° F. of 1; an acid and saponification value of 0; a density at 77° F. of 0.95; a maximum particle of 10 microns; and an average particle size of 2.5 microns.

Lubricant MPP611 is a micronized polyethylene wax, having a melting point of 232° F.; a congealing point of 229° F; a penetration at 77° F. of 1; a density of 0.95; and an average particle size of 2.5 microns.

Lubricant Shamrock 395 is a high-melt polyethylene wax, having a high degree of crystallinity, a melting point of 250° F.; a density of 0.95; and a penetration of less than 1.

EXAMPLE IV

A series of tests were conducted in which web speed and oven temperature during drying of the ultra-thin abrasion-resistant coating on the decor sheet were adjusted so that the maximum web temperature reached was respectively 155° F., 222° F., and 238° F. In each case, the coat weight applied was about 4 pounds per ream. The paper was saturated to a melamine resin content of 53%–55% and a volatile of 5.7%–6.5%. After pressing, each of the laminates were examined.

Paper run at 155° F. produced a laminate with excellent scuff resistance, deep, clear color and no mottle. Paper run at 238° F. produced a laminate with poorer scuff resistance (still much better than no wax), no mottle, but a frosty color (i.e., the color was not deep and rich). Paper run at 222° F., the wax melting point, had a spotty scuff resistance, a mottled appearance, and frosty color.

From these runs, it is concluded that when wax is not melted during the drying of the abrasion-resistant coating, it is available to disperse during laminate pressing and "blooms" to the surface. The wax melting point should be sufficiently low so that it melts and "blooms" at the melting point of the impregnating resin, i.e. melamine or polyester, and before such resin gels. Higher melting point waxes may cause light scattering and a frosty appearance. If the wax melts in the coater, it saturates the paper fibers, preventing resin saturation and keeping the wax from blooming. This causes relatively poor scuff resistance, mottling, and a graying of color.

For best results, the drying of the abrasion-resistant coating containing the lubricant should be at about 170°–190° F., above the minimum temperature of 140° F. and substantially below the melting point of the lubricant which is desirably 220°–230° F.

It will be obvious to those skilled in the art that various changes may be made without departing from the scope of the invention and the invention is not to be considered limited to what is described in the specification.

What is claimed is:

1. In a decor sheet for use as a decorative facing sheet in the manufacture of abrasion-resistant decorative laminates, said decor sheet having thereon an ultra-thin facing layer comprising abrasion-resistant particles and sufficient binder material for said particles to bind said abrasion-resistant particles to the surface of said decor sheet, said decor sheet being imprenated with a thermosetting resin compatible with said binder material, the improvement wherein said ultra-thin layer also contains a solid, particulate lubricant, having a melting point of at least 140° F., in an amount sufficient such that, during use of the decor sheet to make decorative laminate, the particular lubricant melts and blooms to the surface thereby providing an abrasion-resistant laminate having simultaneously good clarity, excellent abrasion resistance and improved stain and scuff resistance, with the proviso that said solid lubricant is not an oxidized wax or a silicone resin.

2. A decor sheet according to claim 1 wherein said lubricant has a particle size of less than 30 microns and a melting point of about 180°–284° F.

3. A decor sheet according to claim 2 wherein said lubricant is a micronized polyethylene wax.

4. A decor sheet according to claim 2 wherein said solid, particulate lubricant is present in an amount, based on the total weight of the components of the ultra-thin facing layer, exclusive of said thermosetting resin, of at least 2.5 percent.

5. A decor sheet according to claim 4 wherein the maximum quantity of said solid, particulate lubricant in said ultra-thin facing layer is about 10 percent.

6. A decor sheet according to claim 4 wherein said solid, particulate lubricant is present in said ultra-thin facing layer in an amount of 0.175 to 0.5 pounds per ream of decor paper.

7. A decor sheet according to claim 2 wherein said thermosetting resin is polyester resin or melamine-formaldehye resin.

8. A decor sheet according to claim 1 wherein said lubricant has a particle size of about 1–25 microns and a melting point of about 220°–230° F.

9. A decor sheet in accordance with claim 1 wherein said lubricant is a polymer wax having a particle size of about 1–25 microns.

10. In a decor sheet for use as a decorative facing sheet in the manufacture of abrasion-resistant decorative laminates, said decor sheet having thereon an ultra-thin facing layer comprising abrasion-resistant particles and sufficient binder material for said particles to bind said abrasion-resistant particles to the surface of said decor sheet, said decor sheet being adapted to be impregnated with a thermosetting resin compatible with said binder material, the improvement wherein said ultra-thin layer also contains a solid, particulate lubricant, having a melting point of at least 140° F., in an amount sufficient such that, during use of the decor sheet to make decorative laminate, the particulate lubricant melts and blooms to the surface thereby providing an abrasion-resistant laminate having simultaneouly good clarity, excellent abrasion resistance and improved scuff and stain resistance with the proviso that said solid lubricant is not an oxidized wax or a silicone resin.

11. In a stain-, scuff- and abrasion-resistant decorative laminate meeting NEMA resistance standards and also capable of withstanding 175–200 cycles of initial wear in the same test, comprising a backing layer and laminated thereto a thermoset laminating resin impregnated decorative facing sheet, said decorative facing sheet having an ultra-thin abrasion-resistant coating on the face thereof which comprises abrasion-resistant particles and sufficient binder material for said particles to bind said abrasion-resistant particles to the surface of said decor sheet, the improvement wherein said ultra-thin layer also contains a solid lubricant having a melting point of at least 140° F., in an amount sufficient to provide good clarity and improved stain and scuff resistance, in addition to excellent abrasion resistance, with the proviso that said solid lubricant is not an oxidized wax or a silicone resin.

12. A decorative laminate in accordance with claim 11 wherein said thermoset resin is melamine-formaldehyde resin or polyester resin.

13. An abrasion-resistant decorative laminate according to claim 12 wherein said lubricant has a melting point of about 180°–285° F.

14. An abrasion-resistant decorative laminate in accordance with claim 12 wherein said lubricant has a melting point of about 220°–230° F.

15. An abrasion-resistant decorative laminate according to claim 12 wherein said lubricant is a polymer wax.

16. An abrasion-resistant decorative laminate according to claim 12 wherein said lubricant is a polyethylene wax.

17. An abrasion-resistant decorative laminate in accordance with claim 12 wherein said ultra-thin abrasion-resistant coating has a calculated thickness of about 0.05–0.3 mils.

18. In a method of producing an abrasion-resistant decorative laminate from at least one backing layer and a thermosetting resin impregnated decor facing sheet, said laminate having enhanced abrasion resistance without an overlay layer, the method comprising providing a decorative facing sheet with an ultra-thin layer of abrasion-resistant particles and sufficient binder material for said particles to bind said particles to the sufface of said decor sheet and with an impregnant of a polyester or melamine-formaldehyde thermosetting resin; assembling said resin-impregnated and coated decor sheet over said backing layer; and subjecting said assembly to heat and pressure to consolidate said backing layer and said decor sheet to thereby provide said abrasion-resistant decorative laminate; the improvement wherein
said ultra-thin wet layer further includes a solid, particulate lubricant, having a melting point of at least 140° F., in an amount sufficient such that during said consolidation step, the particulate lubriant melts and blooms to the surface thereby providing an abrasion-resistant laminate having simultaneously good clarity, excellent abrasion resistance and improved stain and scuff resistance, with the proviso that said solid lubricant is not an oxidized wax or a silicone resin; wherein said consolidation step is carried out at a temperature greater than the melting temperature of said solid, particulate lubricant.

19. A method according to claim 18, wherein said decorative facing sheet is provided with said ultra-thin layer and with said impregnant by the steps of
coating said decorative facing sheet with said ultra-thin layer of said abrasion-resistant particles and said binder material in a wet layer, drying said wet layer on said decor sheet at a temperature of about 170°–190° F. but less than the melting temperature of said solid, particulate lubricant and thereby providing a dried ultra-thin layer in which said abrasion-resistant particles are bound to the surface of said decor sheet by said binder material, and impregnating said coated decor sheet with said thermosetting resin impregnant; and
wherein said solid particulate lubricant is a polyethylene wax having a particle size less than 30 microns, having a melting temperature of less than 260° F. and preferably 220°–230° F.

20. A stain-, scuff- and abrasion-resistant decorative laminate comprising a backing layer and laminated thereto a thermoset laminating resin impregnated facing sheet, said facing sheet having an exposed surface comprising an ultra-thin layer of a binder material and finely divided hard mineral particles, and further including a melted and re-solidified solid lubricant in an amount sufficient to provide good clarity and improved scuff and stain resistance and in the range of 0.175 to 0.5 pounds per ream of said facing sheet, said solid lubricant having a melting point of 220° F. to about 285° F., and the surface of said facing sheet being free of haze.

* * * * *